United States Patent [19]
Kooiman

[11] Patent Number: 4,503,980
[45] Date of Patent: Mar. 12, 1985

[54] DEVICE FOR STACKING OF ARTICLES OF WHICH THE UPPER MOST ARTICLE OF THE STACK IS MAINTAINED AUTOMATICALLY AT A CERTAIN LEVEL

[76] Inventor: Pieter L. Kooiman, 17 Achterambachtweweg, Hendrik Ido Ambacht, Netherlands

[21] Appl. No.: 433,717

[22] Filed: Oct. 12, 1982

[30] Foreign Application Priority Data

Jun. 15, 1982 [DE] Fed. Rep. of Germany ... 8217130[U]
Jun. 18, 1982 [EP] European Pat. Off. ........ 82200768.8

[51] Int. Cl.³ ................................................ A47F 1/06
[52] U.S. Cl. ..................................... 211/41; 108/136; 211/59.2; 312/71
[58] Field of Search ..................... 211/49 D; 108/136; 312/71, 42; 220/93; 221/279

[56] References Cited

U.S. PATENT DOCUMENTS

| 2,435,104 | 1/1948 | Solomon | 312/71 X |
| 2,816,808 | 12/1957 | Haines | 312/71 |
| 3,428,185 | 2/1969 | Vorndran | 108/136 X |
| 3,863,576 | 2/1975 | Olsson | 108/136 |

FOREIGN PATENT DOCUMENTS 7810423  4/1980  Netherlands .
 946227  1/1964  United Kingdom ............ 211/49 D
1596779  8/1981  United Kingdom .

*Primary Examiner*—Robert W. Gibson, Jr.
*Attorney, Agent, or Firm*—Andrus, Sceales, Starke & Sawall

[57] ABSTRACT

Device for stacking of articles of which the upper most article of the stack is maintained automatically at a certain level.

The device comprises a vertical container for the stack of articles, said container having an opening at the upper side around which an annular flange is arranged, on which a number of main tension springs is suspended, which support the body part of a carrier, whereas the supporting plane part of the carrier rests on the body part of the carrier by means of preferentially a single central helical compression spring, having a diameter approaching the main dimension of the carrier.

The strength of this helical compression spring is weaker than that of the body springs, so that at loading with a stack of articles, the supporting plane moves down resiliently faster, and also a greater part of the carrier is used for the stack of articles and thereby an increase of capacity is obtained, with stable support for the stack of articles.

2 Claims, 2 Drawing Figures

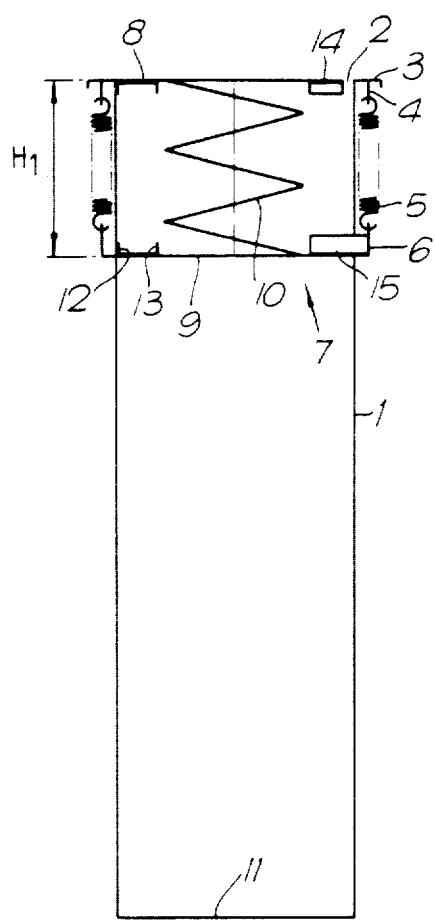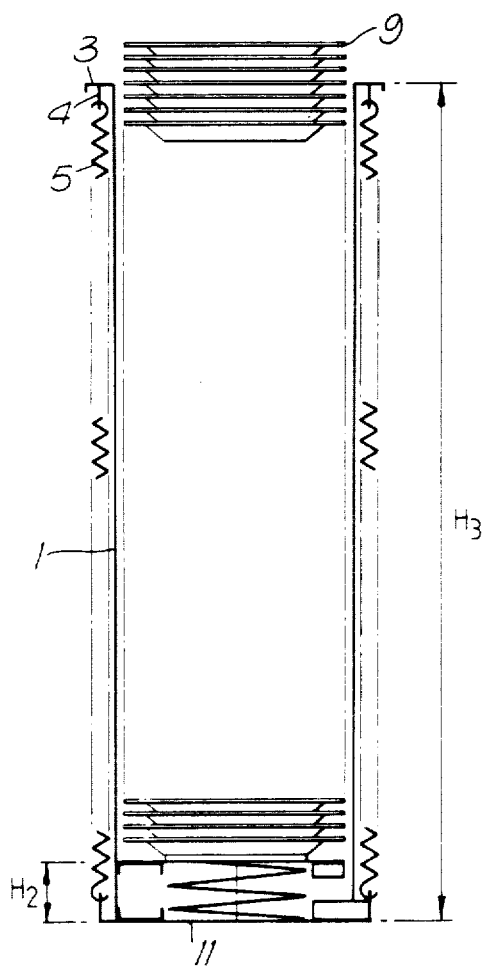

DEVICE FOR STACKING OF ARTICLES OF WHICH THE UPPER MOST ARTICLE OF THE STACK IS MAINTAINED AUTOMATICALLY AT A CERTAIN LEVEL

BACKGROUND OF THE INVENTION

The invention relates to a device for stacking of articles, in which the upper most article of the stack is always kept at a certain height. The device comprises a vertical container for the stack of articles, which container is open at the upper side and has around the opening of the container an edge flange, on which a number of outer edge parts of the body part of a carrier is suspended by means of a number of main tension springs. The carrier is movable in the container under the influence of the stack of articles and of the tension of the main tension springs. The carrier comprises a support plate part, on which the lower most article of the stack of articles is placed. In the space above a bearing plane of the carrier body and below a bearing plane of the support plane part one or more auxiliary compression springs are fixed, so that the carrier is telescopically elastically compressable and thereby the support plane part is relatively movable with respect to the body part under the influence of the auxiliary compression springs. For auxiliary compression springs the constant of the elasticity is smaller than that of the main tension springs.

DESCRIPTION OF THE PRIOR ART

British Pat. No. 1.596.779 shows a device of the above type in which an attempt is made to make a more efficient use of the depth of the container by making the carrier vertically compressable under loading. As auxiliary springs, however, leaf springs are applied here which are bent double in the middle. This structure is disadvantageous in that the several leaf springs are not able to give a stable horizontal support to the stack of articles, so that the carrier may dip and get stuck in the container at loading or unloading on the one hand, and/or cause the collapse of the stack of articles so that this one gets stuck in the container, during transport with accelerations and/or retardations on the other hand.

SUMMARY OF THE INVENTION

The invention aims at removing this object and providing a stacking device of the type defined which gives a stable horizontal support to the stack of articles so that this will not collapse during transport or wobble and get stuck in the container during loading or unloading thereof.

This aim is reached by the invention, in that the one or more auxiliary compression springs are helical springs. These coil springs give a stable support to the carrier and exclude dipping, wobble or sticking thereof.

According to a preferred embodiment of the invention as compression spring a single central helical spring is used having a diameter approaching the main dimension of the carrier.

DESCRIPTION OF THE PREFERRED EMBODIMENT

The invention will now be further elucidated referring to the accompanying drawing of an embodiment.

FIG. 1 shows a schematic side view in axial cross section of a stacking device according to the invention in unloaded condition.

FIG. 2 shows a similar view as FIG. 1, however in unloaded condition, in which the stacking device contains a maximum stack of plates.

According to the drawing the stacking device comprises a container 1 which is provided at the upper side with an opening 2 which is surrounded by an edge flange 3. The shape of the opening 2 can be different, such as round, square, elliptical or such, and is fully dependent on the plan view of the articles to be stacked.

On the edge flange 3 with a vertical, short coupling piece 4, with a number of (not shown) holes a number of tension springs 5 is suspended, of which the lower end is hooked in the (not shown) openings in a similar coupling piece 6 of a carrier body 7. This carrier body 7 is provided at the upper side with a support plane 8 for the articles 9 to be stacked, such as dinner plates in the embodiment shown.

FIG. 1 shows of the carrier 7, 8 to variants of embodiments: the left half has circular vertical flanges 12, 13 and the right half vertical strips 14 and 15. It is evident that also other variants are possible.

Between the support plane 8 and the bearing plane 9 of the carrier body 7 a central, helical spring 10 is connected, having a diameter approaching the main dimension, here the diameter of the carrier 7, 8. At loading the support plane 8 of the carrier 7 the spring 10 is compressed and the carrier height H1 in unloaded condition when loaded is decreased to lower values.

FIG. 2 shows that the carrier 7 has completely moved into the container 2 and that the lower plane 9 of the carrier 7 rests on the bottom 11 of this container. Thereby the tension springs 5 are maximally extended, whereas the compression spring 10 is compressed, so that the distance between the support plane 8 and the bearing plane 9 of the carrier 7 is decreased to the minimal distance H2 in FIG. 2.

As H2 is smaller than H1 a more efficient use is made of the total height H3 of the container 1.

Instead of a single central helical compression spring 10 also a number of compression springs, both coil or cone shaped or further differently executed, can be connected between the support plane 8 and the bearing plane 9 of the carrier 7, provided that an uninterrupted telescopical compression and extension at placing and removal respectively of a stack of plates stays guaranteed.

The constant of elasticity Cv10 of the one or more auxiliary springs 10 is in the shown embodiment smaller than the constant of elasticity Cv5 of the main springs 5. It is also possible that this spring constant Cv10 is equal or larger than Cv5, provided that these springs 10 are compressed in the position of the carrier in the bottom of the container 1 (viz. FIG. 2).

The embodiments of invention in which an exclusive property or privilege is claimed are defined as follows:

1. A device for stacking articles in which the uppermost article is always kept at a certain height, comprising;
    a vertical container for receiving a stack or articles having an open upper end and an outwardly extending edge flange around said open upper end;
    a carrier for supporting a stack of articles within said container and mounted for vertical movement relative to said container, said carrier including an upper support member on which the lowermost article of the stack of articles is supported, a lower bearing member spaced from said support member having an outer edge projecting outwardly beyond said container, a helical compression spring positioned between said support and bearing members for supporting said support member for vertical movement relative to both said bearing member and said container;

a plurality of main tension springs each having first and second opposite ends, said first ends connected to said edge flange and said second ends connected to the outer edge of said bearing member for suspending said carrier from said container;

means on said support member and said bearing member for containing opposite ends of said helical compression spring; and said compression helical spring having a constant of elasticity less than that of the main tension springs and a diameter of substantially the same dimension as said container to provide stable horizontal support to a stack of articles at all times.

2. A device according to claim 1 characterized in that, the cross section of the opening of the container is of the same form as that of the carrier.

* * * * *